Feb. 22, 1938.    E. BREITLING    2,109,309
CASH REGISTER, ACCOUNTING, AND THE LIKE MACHINES
Filed Sept. 5, 1935    7 Sheets-Sheet 1

*Fig.1*

Inventor
Ernst Breitling
By
His Attorney

Feb. 22, 1938.  E. BREITLING  2,109,309

CASH REGISTER, ACCOUNTING, AND THE LIKE MACHINES

Filed Sept. 5, 1935  7 Sheets—Sheet 2

Ernst Breitling
Inventor

By *Carl Beust*
His Attorney

Fig.3

Feb. 22, 1938.  E. BREITLING  2,109,309
CASH REGISTER, ACCOUNTING, AND THE LIKE MACHINES
Filed Sept. 5, 1935  7 Sheets-Sheet 5

Fig. 5

Inventor
Ernst Breitling
By
His Attorney

Feb. 22, 1938.  E. BREITLING  2,109,309
CASH REGISTER, ACCOUNTING, AND THE LIKE MACHINES
Filed Sept. 5, 1935  7 Sheets-Sheet 7

Inventor
Ernst Breitling
By
Earl Benst
His Attorney

Patented Feb. 22, 1938

2,109,309

UNITED STATES PATENT OFFICE 2,109,309

CASH REGISTER, ACCOUNTING AND THE LIKE MACHINES

Ernst Breitling, Berlin-Tempelhof, Germany, assignor to The National Cash Register Company, Dayton, Ohio, a corporation of Maryland Application September 5, 1935, Serial No. 39,208
In Germany November 20, 1934

8 Claims. (Cl. 101—93)

The invention relates to cash registers, accounting and the like machines and more particularly to such machines provided with a positively actuated differential device performing a differential movement for differentiating registering and recording devices.

The main object of the invention is to adapt a differential device of the type specified for zero eliminating and printing without affecting in any way totalizer engagement.

Another object of the invention is to increase the speed of such a differential device by effecting zero eliminating and printing during the differential movement of the differential device.

Another object of the invention is to effect zero eliminating and printing simultaneously in an indicating device and a recording device.

Another object of the invention is to adapt a differential device of the type specified for performing an additional step independent of its main setting movement for differentiating the indicating and recording device.

Another object of the invention is to adapt such a differential device for controlling the one of the next denominational order.

Another object of the invention is to provide for zero eliminating to the left of any digit and zero printing to the right of it with a digit in any of the following denominational orders.

Another object of the invention is an arrangement of parts for effecting zero eliminating by moving the type and the indicating carriers in either way forward or backward.

Further objects of the invention will be pointed out in the following detailed description with reference to the annexed drawings.

A preferred form of an embodiment of the invention is shown in the annexed drawings.

Of said drawings:

Figs. 9 and 10 show another embodiment of the invention, and Fig. 11 an evolved portion of a type wheel apt for said modified embodiment.

Amount differential devices

Figure 1:
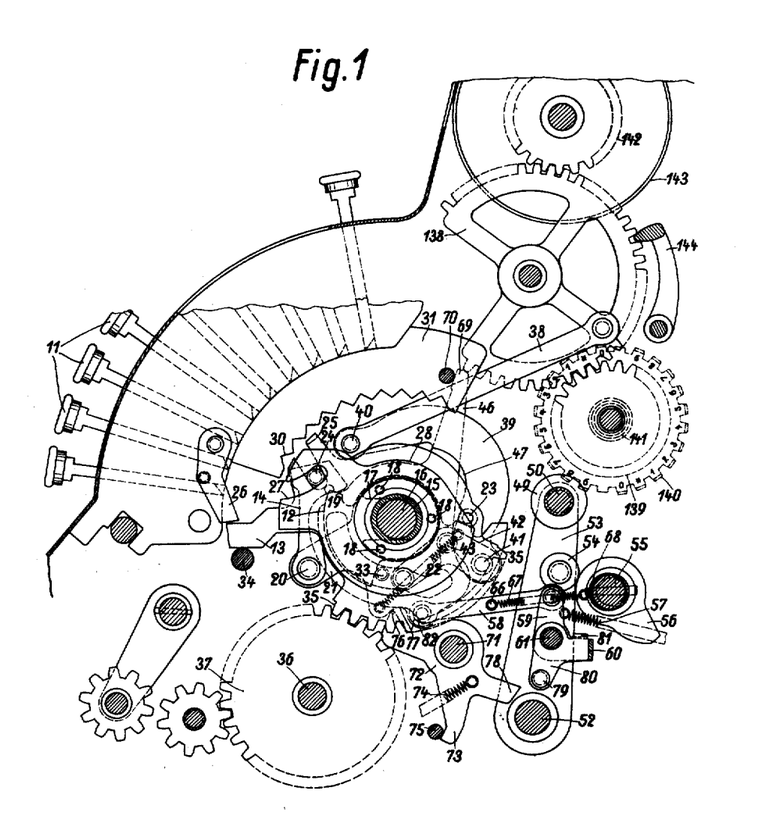
Fig. 1 is a side view of an amount differential device provided with a zero eliminating and printing actuating device.
Figures 2, 8:
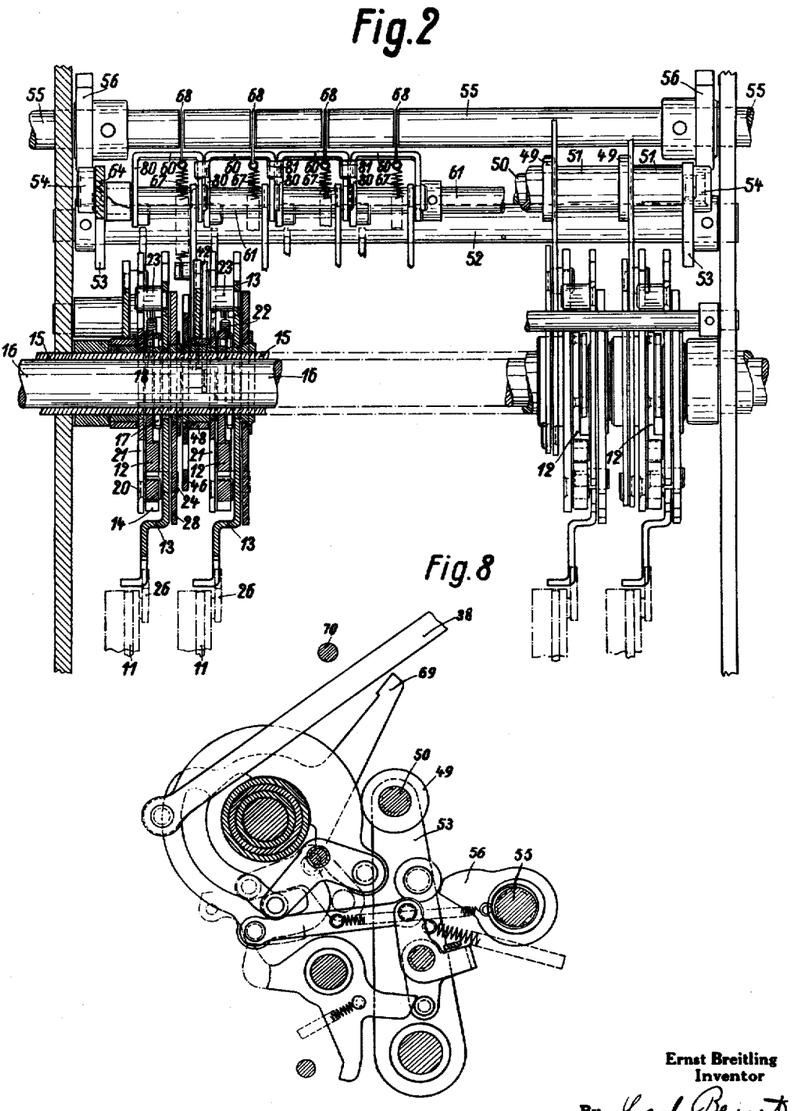
Fig. 2 is a top view of the amount differential devices of two succeeding denominational orders, partly in section according to line II—II of Fig. 1, Figs. 3 and 4 are side views of the differential device in rest position and after setting with the zero stop pawl in effective position respectively.
Figs. 6, 7 and 8 show in side views the zero eliminating and printing actuating device in rest, zero print, and zero eliminating position.
Figure 3:
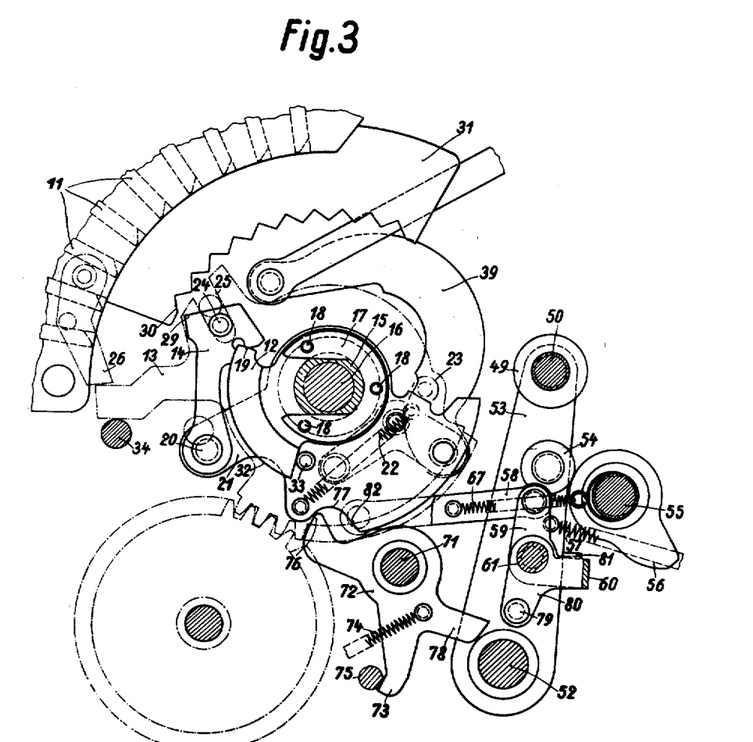

With each of the amount key banks 11 is cooperating one amount differential device each comprising an actuating member 12, a differential member 13 and a latch 14 (Figs. 1 to 3). The actuating member 12 is mounted on a tube 15 mounted upon a shaft 16. The actuating member 12 is secured by means of a clamp 17 (Fig. 3) to the tube 15 the prongs of said clamp being inserted into recesses of the tube 15 and are fastened by pins 18 to the clamps 17. By the main drive (not shown) the tube 15 and, in connection therewith, all the actuating members 12 are rotated, first, in clockwise direction and, then, returned in counter-clockwise direction to normal. When in normal position, the latch 14 engages from behind a radial surface 19 of the actuating member 12. The latch 14 is pivotally mounted on a pin 20 of a carrier 21 rotatably mounted on the tube 15 and normally engaging under the action of a spring 22 a pin 23 of the differential member 13 also secured to the tube 15. A pin 24 of the latch 14 engages an inclined slot 25 of the differential member 13 as well as an opposite inclined slot 27 of a disk 28 also mounted on the tube 15.

Figure 4:
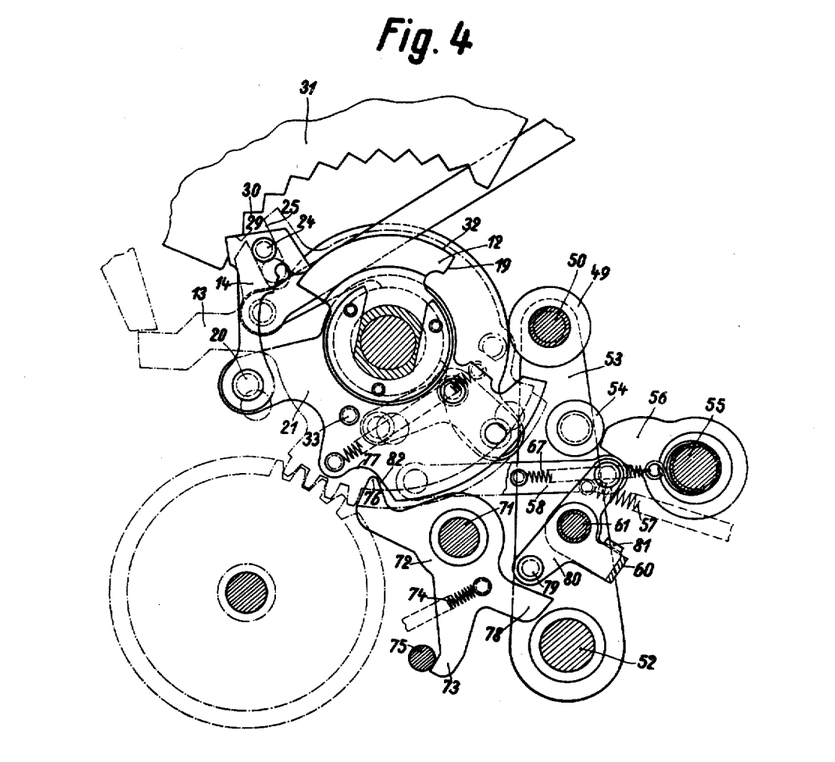

The differential member 13 when moving clockwise is stopped directly by the zero stop pawl 26 or by the foot of a key depressed. When in an amount key bank no key is depressed, the zero stop pawl 26 of this bank remains in its effective position (Figs. 1 and 3) and thus, during the machine operation, the differential member 13 of the differential device of this key bank is prevented by the zero stop pawl 26 from being moved, although the tube 15 and the actuating member 12 are rotated clockwise. Against the action of the spring 22, the actuator 12 carries along in clockwise rotation the latch 14 and, in connection therewith, the carrier 21. By this time the pin 24 of the latch 14 enters the declined slot 25 of the arrested differential member 13, whereby the latch 14 is rotated counter-clockwise about its pivot 20. When the latch 14 is entirely removed from the radial surface 19 of the actuator 12, its locking nose 29 is entered into the first notch 30 of a toothed segment 31 (Fig. 4). The actuating member 12 continues its clockwise rotation, and holds, by means of its arcuate surfaces 32, the latch 14 in engagement with the segment 31. Thus the carrier 21 is accurately adjusted. The differential member 13 and the carrier 21 are distanced from one another by so many degrees as there are degrees between two keys 11.

When the actuator 12 returns counter-clockwise to normal position, it strikes a pin 33 of the carrier 21 and restores the latter thereby into normal position in which it engages the pin 23 of the differential member 13. Thereat the pin 24 slides down in the inclined slot 25, so that the latch 14 is clockwisely rotated till it engages again the radial surfaces 19 of the actuator 12. The differential member 13 the rest position whereof is secured by a cross rod 34, has not been moved during this operation as already mentioned.

Figure 5:
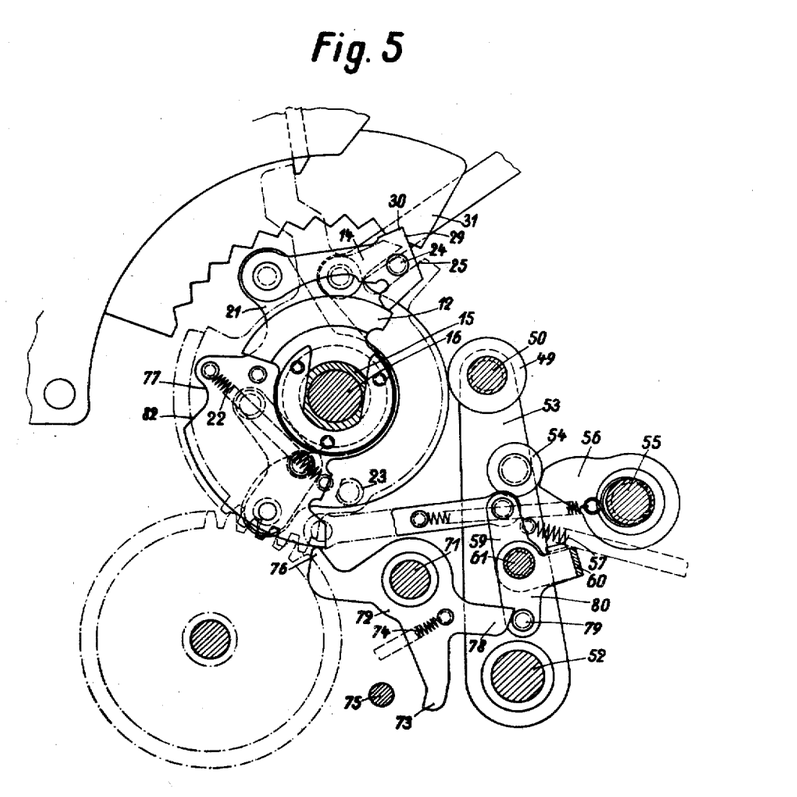
Fig. 5 is a side view of the differential device after being set under control of a depressed key.

When, before the start of a machine operation, in an amount key bank a key, for instance, the key "9" (Fig. 5) has been depressed, the zero stop pawl 26 has been moved into its ineffective position. During its clockwise rotation, the actuator 12 carries along the latch 14 and the carrier 21 and, by means of the spring 22, the differential member 13 till the latter is arrested by the stem of the depressed key. Now, only the carrier 21 can be moved by the actuator 12 against the tension of the spring 22. During the continued movement of the carrier 21, the latch 14 is given a counter-clockwise rotation by the inclined slot 25 of the differential member 13, whereby the latch 14 is removed from the radial edge 19 of the actuator 12, and the nose 29 of the latch 14 has entered the last notch 30 of the segment 31.

To prevent the latch 14 from being disengaged too early, the pin 24, as mentioned already, extends also into an inclined slot 27 (Fig. 1) of the disk 28. Thus, when the actuator 12 rotates clockwise, it rotates the disk 28 by means of the pin 24. As the direction of the slot 27 is opposite to that of the slot 25, the pin 24, the disk 28, while the latch 14 is rocking in counter-clockwise direction. It is a special function of the slot 27 to counteract the inertia of the differential member 13. At the beginning of a movement of the differential device, the differential member 13, especially when, as it occurs especially with total taking, a comparatively great number of parts is connected thereto, is intending, against the action of the spring 22, to remain in the position maintained heretofore. However, remaining in such position would cause, due to the inclined slot 27, the latch 14 to be disengaged. Since, however, the disk 28 has to be accelerated when the latch 14 is disengaged, the force required has to be greater than the remainder of force required for accelerating the differential member 13 which power, however, can not be afforded by the spring 22.

A toothed segment 35 of the differential member 13 meshes with an intermediate wheel 37 rotatable on shaft 36, with which wheel 37 the adding wheels of the totalizers not shown, can indirectly be brought into mesh. This occurs before the actuators 12 return in counterclockwise direction into normal position. When then the pins 33 and 23 restore the differential members 13 to normal, the engaged adding wheels are advanced by a number of steps corresponding to the key depressed, by means of the toothed segments 35 and the intermediate wheels 37. Further, also the indicating and the type carriers have to be adjusted according to the respective position of the differential member 13. The type and the indicating carriers are moved out of their old positions directly into their new positions, that is, by a minimum movement device.

Each amount differential device is connected by a beam 38 to a toothed segment 138 with which a gear 139 of the type wheel 140 meshes. The type wheels 140 are carried on the ends of tubes 141. The segment 138 also meshes with a gear 142 of the appertaining indicating wheel 143. In the usual way the indicators and type wheels are held in their set positions by a pawl 144 engaging the segment 138 when at rest. The lower end of the beam 38 is linked at 40 to a minimum movement device 39. The latter is pivotally mounted on a pin 41 of an arm of a bell crank lever 42 (see Fig. 6) pivotally arranged on a pin 43 of the latch carrier 21. The other arm of the bell crank 42 has mounted thereon a roller 44 engaging a cam slot 45 of a disk 46.

In order to transfer the setting of the amount differential devices to the type wheels 140 and the indicating wheels 143, the inward arcuate surface 47 of the minimum movement device 39 has to be brought into contact with a sleeve 48 connected to the disk 46. This is effected by rollers 49 mounted on a cross rod 50 (see Figs. 1 and 2) and held by means of spacing collars 51 within the planes of the device 39. The cross rod 50 is supported by two arms 53 secured to a shaft 52, which arms carry rollers 54 cooperating with two cams 56 secured to a shaft 55. Springs 57 hold the rollers 54 of the arms 53 in contact with the cams 56. The shaft 55 is given a clockwise rotation during each machine operation. During the setting of an amount differential device the cams 56 act upon the rollers 54, and rock the arms 53 together with the cross rod 50 against the action of the spring 57, whereat the disk 49 acts upon the device 39 and moves the inward arcuate edge 47 of this arm into contact with the sleeve 48 (see Fig. 7). After the cam 56 has left the roller 54, the arm 53 returns into normal position under the action of the spring 57 (Figs. 1, 3 and 7), whereupon the disk 46 is moved into rest position by the latch carrier 21 during the return movement of the actuating member 12. This movement does in no way affect the differentiation of the indicator 143 and the type wheels 140 because of the toggle joint connection of the device 39 and the beam 38.

*Zero printing and eliminating device*

The type wheels 140 and the indicator wheels 143 in the preferred embodiment of the invention, except the wheels of the three lowest denominational orders, have engraved at the lowest position a cipher, then an asterisk (\*) and thereafter the numerals "1", "2", "3" and so on (Fig. 1). Therefore, when an amount differential device is set by the zero stop pawl 26 of a key bank, the asterisk is moved into printing position. If, for instance, the amount of $3,000.—has been set up on a key board of seven denominational orders, first, the following types of the type wheels are rocked into the printing plane:— \*3,\*\*0.00. Therefore, before the print is effected, the two asterisks to the right of the digit "3" have to be moved out of the printing plane and "0", "0" moved into the printing plane which is effected by turning the respective type wheels 140 and simultaneously the respective indicating wheels 143 back by one step.

This additional movement is effected by the disks 46. Each disk 46 is connected by a link 58 to an arm 59 of a bail 60 rotatable on a cross rod 61 (see Figs. 2 and 7). The cross rod 61 is supported by the two arms 53 secured to shaft 52. Each link 58 has provided thereon a pin 66 (Figs. 1, 6 and 7) having connected thereto a spring 67 the right hand end thereof being secured to an eye of a ring surrounding the shaft 55. Thus the spring 67 keeps a projecting arm 69 of the disk 46 in contact with a stop 70.

When the arms 53 are rocked in counter-clockwise direction by the cams 56, they carry along the cross rod 61. However, the counter-clockwise movement of the cross rod 61 does not cause any displacement of the disks 46, but free the bails 60 to be rocked under the action of the springs 67 in clockwise direction (Fig. 4). Only when this clockwise rotation of a bail 60 in any denominational order is prevented, the appropriate disk 46 is clockwisely rotated while the cross rod 61 is moving in counter-clockwise direction.

In order to prevent a clockwise rotation of the bails 60, a shaft 71 has mounted thereon locking members 72 having an extension 73 normally engaging under the action of springs 74 a fixed stop 75 and a nose 76 engaging a recess 77 of the carrier 21. Further, each locking member 72 has a locking projection 78 enabled to be moved into the path of a pin 79 of the second arm 80 of the bail 60. When the locking projection 78 of a bail 60 has been moved into effective position, the bails 60 allotted to the lower denominational orders, are also prevented from clockwise rotation, since the arm 80 of each bail 60 has a flange 81 extending over the arm 59 of the bail 60 allotted to the next higher denominational order.

The locking members 72 are moved into the effective position by the carriers 21. As long as the nose 76 of a locking member 72 rests in the recess 77 of the pertinent carrier 21, the locking member 72 is kept in its ineffective position by its spring 74, which is the case with the machine at rest or with the differential member 13 arrested by the zero stop pawl 26, whereat the carrier 21 is positioned as shown in Fig. 4. When, however, in any key bank a key has been depressed, during the following machine operation the carrier 21 is clockwisely rocked beyond the position as per Fig. 4. Thereat an inclined edge 82 acts upon the nose 76, rocks the locking member 72 in counter-clockwise direction against the action of the spring 74 and moves thereby the locking projection 78 into the path of the pin 79 of the appropriate bail 60 (see the position shown in full lines of the locking member 72 in Fig. 5). When, now, during the counter-clockwise rocking of the arms 53, the cross rod 61 is carried along, the locking projection 78 moved into the path of the pin 79 prevents the bail 60 from being clockwisely rotated under the action of the spring 67. As a consequence thereof the counter-clockwise rocking of the arms 53 and the cross rod 61 rotates the disk 46 by the link 58 to a minor extent in clockwise direction.

The disks 46 are rotated in all the denominational orders (except the three lowest denominational orders) in which the differential members 13 are set to any digit, and in those orders in which the differential members 13 are set to "0", but are of lower order than the orders in which a digit has been set up. This rocking movement, however, causes that the appropriate type and the indicator wheels are reset by one step only in those denominational orders having their differential members 13 adjusted by the zero stop pawls 26, and the associated type wheels with asterisks in the printing line and indicating line respectively.

Figures 6, 7:
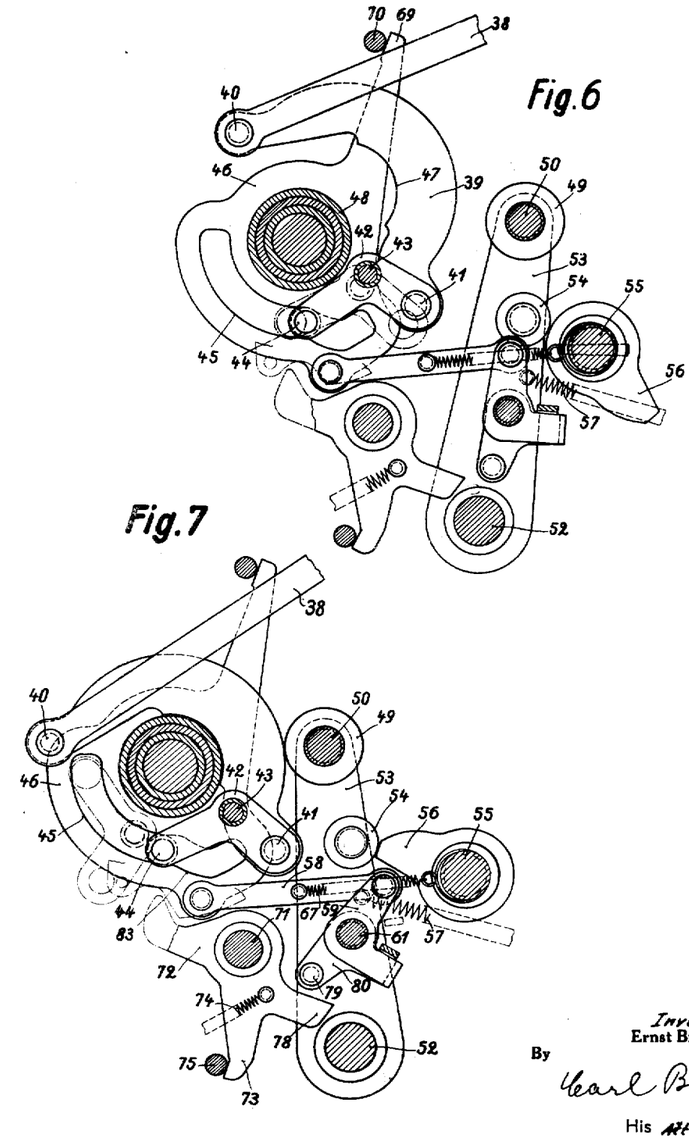

Return movement of the type and the indicator wheels by one step is effected by the cam slot 45 of the disk 46, by which the roller 44 of the bell crank 42 is guided. With the machine at rest, the bell crank 42 is positioned as shown in Fig. 6 by full lines. When the differential device is arrested, for instance, by the zero stop pawl of the appropriate key bank, the roller 44 of the bell crank 42 driven by the carrier 21, becomes positioned as per Fig. 7 (full lines). Now, when the disk 46 is rocked in clockwise direction (Fig. 8), the portion 83 of the cam slot 45 acts upon the roller 44, rocks the bell crank 42 in counter-clockwise direction, and causes the minimum movement device 39 to reset the rod 38 by one unit.

When, however, an amount differential device is set by a depressed key, the roller 44 has travelled in clockwise direction in the concentric portion of the cam slot 45 out of its rest position as per Fig. 6 to a greater or less extent. However, in each case, the distance from the rest position suffices to prevent the portion 83 of the cam slot 45 from acting upon the roller 44 and displacing the rod 38 during the latter clockwise rotation of the pertinent disk 46. Thus, in all the denominational orders having the amount differentials allotted thereto, set to any digit, the disks 46 are rocked which movement, however, does not have any effect on the type wheels and the indicating device.

Second embodiment

Figures 10, 11:
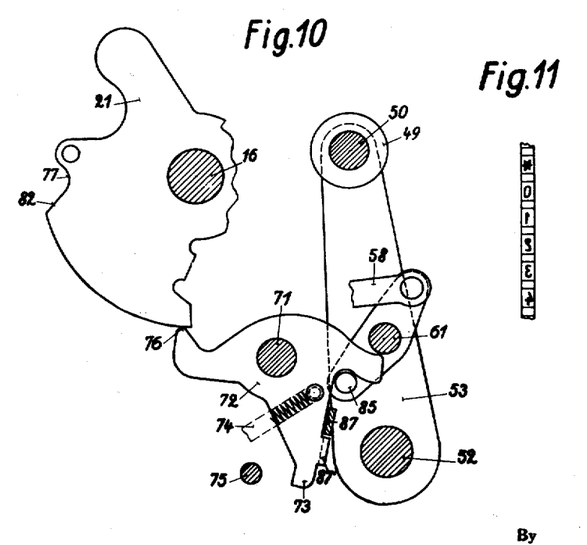

The arrangement may, however, be made so that the type wheels in normal positions show "0", and this cipher comes into the printing plane when the appropriate amount differential device is set by the zero stop pawl. Fig. 11 shows a portion of such a type wheel evolved. When, for example $3,000.— are set up the types "03,000.00" would be in the printing line. In this case the "0" before the digit of highest denominational order had to be removed from the printing line, and an asterisk has to be moved into the printing line by returning the type wheel 140 by one unit.

Figure 9:
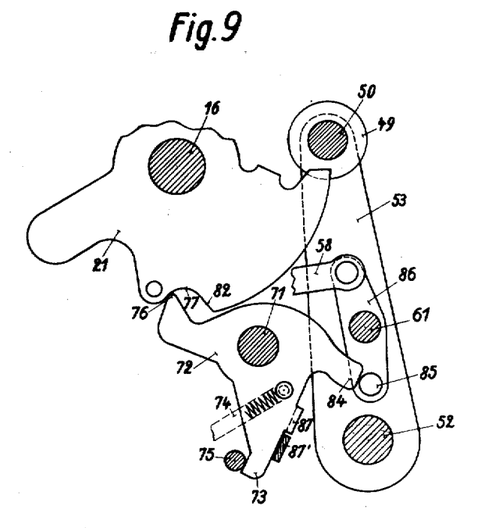

A zero printing and eliminating device according to the invention as illustrated in Figs. 9 and 10 is perfectly adapted to suit that purpose. In this modified embodiment the locking members 72 are provided with locking projections 84 positioned in the path of the pins 85 with the machine at rest. The said pins 85 are mounted on levers 86 pivoted on the cross rod 61. The levers 86 correspond to the bails 60 of the first described construction, that means, they are connected by links 58 with the disks 46. Each locking member 72 has a flange 87 extending into the path of the locking member of the next higher denominational order.

When a differential device is set to any digit, the inclined edge 82 of the carrier 21 acts upon the nose 76 of the pertinent locking member 72, rocks it against the action of the spring 74 in counter-clockwise direction and moves the locking projection 84 out of the path of the pin 85. During this counter-clockwise movement, a flange 87' carries along the locking member 72 of the next lower denominational order, and its locking extension 84 is also moved into ineffective position. In this manner the locking members 72 of all the denominational orders lower than those being set to any digit, are rendered ineffective. Only the locking members 72 of those denominational orders higher than the highest being set to any digit, remain in their effective positions. In these denominational orders, therefore, the levers 86 are not able to rock in clockwise direction while the arms 63 and the cross rod 61 rock in counter-clockwise direction, but they rotate the disks 46, whereby in the manner set forth already, the respective type and the indicating wheels are turned back by one step and asterisks moved into the printing and the indicating line.

With the two structures described herein, it was assumed that the three lowest denominational orders are not provided with zero eliminating, and thus the type wheels of these orders do not have a void position. However, it is easily understood that in these three orders, void prints of any kind can be effected and indicated respectively. Essential for the structure according to the invention is the variable or toggle joint like connection of the indicating and the printing device with the differential device which allows for the additional step without in any way whatever affecting the engagement of the totalizer intimated in Fig. 1 or the timing of it or causes any special arrangement to take care of this additional step in totalizer engagement.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a cash register, accounting and the like machine provided with a recording device containing type carriers, a differential device performing a differential movement during a machine operation, said differential device consisting of an actuating and a differential member, a latch for connecting and disconnecting both said members and thereby effecting the differential movement for differentiating said type carriers, a special member in said differential device adapted to perform an additional step, a zero eliminating device connected to and actuated by said differential device, means for interconnecting the zero eliminating device of one denominational order with the one of the next order, said means adapted when arrested by a connecting means of the next order to impart the additional step to the said special member during the said differential movement of the differential device.

2. In a cash register, accounting and the like machine provided with an indicator and a recording device comprising indicating and type carriers, a differential device consisting of an actuating member and a differential member, a latch for connecting and disconnecting both members, a carrier for said latch, a member in said differential device for connecting the latter with the indicating and the type carriers and adapted to remain in the set position at the end of a machine operation, a special member in said differential device adapted to perform an additional step and transmit it to the before-named connecting member, a zero eliminating device connected to and actuated by said differential device, and means for interconnecting the zero eliminating device of one denominational order with the one of the next order, said means adapted when arrested by an interconnecting means of the next order to impart the additional step to the said special member during the differential movement of the differential device.

3. In a cash register, accounting and the like machine provided with an indicating and a recording device comprising indicating and type carriers, a differential device consisting of an actuating member and a differential member the latter adapted to be directly arrested by any stopping element moved into its path, a latch for connecting and disconnecting both said members of the differential device, a carrier for said latch, a member in said differential device for connecting the latter with the indicating and the type carriers and adapted to remain in its set position at the end of a machine operation and to be adjusted directly to any other position in a subsequent machine operation, a special member in said differential device adapted to perform an additional step and transmit it to the beforenamed connecting member, a zero eliminating device connected to and actuated by said differential device, means for interconnecting the zero eliminating device for one denominational order with the one of the next order, and locking means cooperating with said interconnecting means and adapted when rendered operative to arrest the interconnecting means of the next order thereby imparting the additional step to the said special member during the differential movement of the differential device.

4. In a cash register, accounting and the like machine provided with an indicator and a recording device comprising indicating and type carriers, said indicating and said type carriers provided with an operative position remote from the zero position by one step, a key bank, a zero stop pawl in said key bank, a differential device for said key bank, consisting of an actuating member and a differential member the latter adapted to be directly arrested by the said zero stop pawl or a key of the key bank respectively when depressed, a latch for connecting and disconnecting both said members, a carrier for said latch, a member arranged on said carriers for connecting the differential device with the indicating and the type carriers and adapted to remain in its set position at the end of a machine operation and to be adjusted directly to any other position in a subsequent machine operation, a special member in said differential device adapted to perform an additional step and transmit it to the beforenamed connecting member, a zero eliminating device connected to and actuated by said differential device, means for interconnecting the zero eliminating device of one denominational order with the one of the next order and locking means cooperating with said interconnecting means and adapted when rendered operative to arrest the interconnecting means of the next order thereby imparting the additional step to the said special member during the differential movement of the differential device.

5. In a machine of the class described, the combination of a type carrier, a differential mechanism, a minimum movement device controlled by the differential mechanism, connections between the minimum movement device and the type carrier and operated by the differential mechanism to adjust the type carrier directly from a set position to another position, and means for modifying the adjustment of the minimum movement device from the position to which it is set under control of the differential device, whereby the adjustment of the type carrier is modified a like extent directly by the movement of the minimum movement device.

6. In a machine of the class described, the combination of a type carrier, a differential mechanism, a pivoted member carried by one element of the differential mechanism and differentially adjusted thereby, a minimum movement device connected to the pivoted member, connections between the minimum movement device and the type carrier whereby the type carrier is set under control of the differential device directly from a set position into another position, a control plate coacting with the pivoted member, and means to actuate the control plate and thereby operate the pivoted member to modify the setting of the minimum movement device and the type carrier from the position to which it is set under control of the differential mechanism.

7. In a machine of the class described, the combination of a type carrier, a differential mechanism, a zero stop to arrest the differential mechanism in zero position, a minimum movement device controlled by the differential mechanism for adjusting the type carrier directly from any adjusted position into a new position when the differential mechanism is arrested by the zero stop, a pivoted member connecting an element of the differential mechanism and the minimum movement device, a control plate coacting with the pivoted member to normally prevent operation of the pivoted member, and means, effective when the differential is stopped by the zero stop, to actuate the control member and through the control member operate the pivoted member, whereby the adjustment of the minimum movement device by the differential mechanism is modified to move the type carrier into its zero position.

8. In a machine of the class described, the combination of a type carrier, a differential mechanism, a zero stop to arrest the differential mechanism in zero position, a minimum movement device controlled by the differential mechanism for adjusting the type carrier directly from any adjusted position into a new position when the differential mechanism is arrested by the zero stop, a pivoted member connecting an element of the differential mechanism and the minimum movement device, a control plate coacting with the pivoted member to normally prevent operation of the pivoted member, a normally ineffective means to operate the control plate, a means controlled by an element of the differential mechanism to render the last named means effective to operate the control plate, whereby the pivoted member, the minimum movement device and the type carrier are given a step movement to adjust the type carrier into zero position.

ERNST BREITLING.